US008596662B2

(12) United States Patent
Huang-Tsai

(10) Patent No.: US 8,596,662 B2
(45) Date of Patent: Dec. 3, 2013

(54) VEHICLE PEDAL

(75) Inventor: Li-Yueh Huang-Tsai, Tainan (TW)

(73) Assignee: Lun An Pan Enterprise Co., Ltd., Tainan County (TW)

( * ) Notice: Subject to any disclaimer, the term of this patent is extended or adjusted under 35 U.S.C. 154(b) by 834 days.

(21) Appl. No.: 12/820,150

(22) Filed: Jun. 22, 2010

(65) Prior Publication Data

US 2011/0309595 A1 Dec. 22, 2011

(51) Int. Cl.
*B60R 3/00* (2006.01)

(52) U.S. Cl.
USPC .......................... 280/169; 280/163; 280/164.1

(58) Field of Classification Search
USPC ....................................... 280/163, 164.1, 169
See application file for complete search history.

(56) References Cited

U.S. PATENT DOCUMENTS

| | | | | |
|---|---|---|---|---|
| 1,896,797 | A * | 2/1933 | Leamy | 280/169 |
| 2,070,839 | A * | 2/1937 | Place | 52/177 |
| 2,077,822 | A * | 4/1937 | Baker | 343/712 |
| 2,084,014 | A * | 6/1937 | Bronson | 280/169 |
| 2,358,206 | A * | 9/1944 | Boersma | 52/716.5 |
| 4,203,611 | A * | 5/1980 | Makela | 280/163 |
| 5,713,589 | A * | 2/1998 | Delgado et al. | 280/163 |
| 5,738,180 | A * | 4/1998 | Hofmann et al. | 180/291 |
| 5,769,439 | A * | 6/1998 | Thompson | 280/163 |
| 5,961,138 | A * | 10/1999 | Roark et al. | 280/291 |
| 6,173,979 | B1 * | 1/2001 | Bernard | 280/163 |
| 7,445,221 | B2 * | 11/2008 | Kobayashi | 280/166 |
| 7,722,067 | B2 * | 5/2010 | Stoops | 280/169 |
| 7,946,604 | B2 * | 5/2011 | Crandall | 280/163 |
| 8,002,299 | B2 * | 8/2011 | Huang-Tsai | 280/169 |
| 8,016,309 | B2 * | 9/2011 | Flajnik et al. | 280/169 |
| 8,152,187 | B1 * | 4/2012 | Crandall | 280/163 |
| 8,403,348 | B1 * | 3/2013 | Wang | 280/163 |
| 8,448,968 | B1 * | 5/2013 | Grote et al. | 280/163 |
| 2003/0184039 | A1 * | 10/2003 | Schumacher | 280/163 |
| 2003/0222423 | A1 * | 12/2003 | Weir | 280/163 |
| 2004/0150183 | A1 * | 8/2004 | Clermont et al. | 280/163 |
| 2006/0114685 | A1 * | 6/2006 | Seeber | 362/495 |
| 2007/0138757 | A1 * | 6/2007 | Kuntze et al. | 280/163 |
| 2008/0258421 | A1 * | 10/2008 | Crandall | 280/163 |
| 2009/0224505 | A1 * | 9/2009 | Peterson et al. | 280/164.1 |
| 2009/0267374 | A1 * | 10/2009 | Mulder | 296/37.1 |
| 2010/0244397 | A1 * | 9/2010 | Huang-Tsai | 280/163 |
| 2011/0266766 | A1 * | 11/2011 | Huang-Tsai | 280/169 |
| 2011/0309595 | A1 * | 12/2011 | Huang-Tsai | 280/169 |

* cited by examiner

*Primary Examiner* — Jeffrey J Restifo
*Assistant Examiner* — Erez Gurari
(74) *Attorney, Agent, or Firm* — Alan Kamrath; Kamrath IP Lawfirm, P.A.

(57) ABSTRACT

A vehicle pedal includes a main plastic pedal, a decoration, at least an adhesive sheet and an anti-slipping rubber plate, and a rack. The main plastic pedal has at least a pedal portion having plural small recesses respectively bored with a through hole. The decoration also has plural small recesses respectively bored with a through hole, and plural projections formed in the bottom to correspond to the small concaves. Plural positioning blocks are fitted in the through holes of the decoration. The adhesive sheet is glued between the pedaling portion of the decoration and the anti-slipping rubber plate, having plural through holes, with two sides coated with a glue layer. The anti-slipping rubber plate has plural positioning bars inserted through the through holes of the adhesive sheet to be restricted by the positioning blocks.

3 Claims, 6 Drawing Sheets

VEHICLE PEDAL

BACKGROUND OF THE INVENTION

1. Field of the Invention

This invention relates to a vehicle pedal, particularly to one reinforced with a rack and effectively anti-slipping.

2. Description of the Prior Art

Commonly, a vehicle like a recreation van or a sport utility vehicle has a rather highly elevated body so that it is inconvenient for passengers like the aged, children or people with disabilities to get on and off. To offset the inconvenience, a pedal is thus assembled at two sides of the van respectively to help passengers get on and off easily. As shown in FIG. 1, a conventional pedal 1 is mainly made of metal, with a plurality of projected streaks 11 formed on it to achieve an anti-slipping function. However, as the pedal is made of metal, it is not possible to effectively create friction with shoes, permitting a passenger to fall down, especially in rainy days.

SUMMARY OF THE INVENTION

The object of this invention is to offer a vehicle pedal, which is reinforced with a rack and effectively anti-slipping.

The main characteristics of the invention are a main plastic pedal, a decoration, at least an adhesive sheet and an anti-slipping rubber plate, and a rack.

The main plastic pedal is provided with a supporting surface having at least a pedaling portion. Formed in the pedaling portion are plural conical grooves and plural small recesses, with a threaded hole bored in each conical groove and with a through hole bored in each small recess.

The decoration is laid on the supporting surface of the main plastic pedal, provided with at least a pedal portion to correspond to the pedal portion of the main plastic pedal. The pedal portion is provided with plural conical grooves respectively bored with a through hole for being inserted by a screw to threadably engage with the threaded hole of the main plastic pedal. Plural projections are formed in the bottom of the decoration to correspond to the conical grooves and employed to engage with the conical grooves of the main plastic pedal. The pedal portion is further provided with plural small recesses respectively bored with a through hole being fitted by a positioning block. And plural projections are formed in the bottom of the decoration to correspond to the small recesses.

The adhesive sheet is correspondingly laid between the pedaling portion of the decoration and the anti-slipping rubber plate, provided with plural holes and having two sides respectively coated with a glue layer.

The anti-slipping rubber plate is correspondingly installed on the pedaling portion of the decoration, provided with plural positioning bars located on the bottom for being inserted through the holes of the adhesive sheet to be restricted by the positioning bars.

The rack is installed at the bottom of the main plastic pedal.

BRIEF DESCRIPTION OF DRAWINGS

This invention is better understood by referring to the accompanying drawings, wherein.

DETAILED DESCRIPTION OF THE PREFERRED EMBODIMENT

Figure 1:
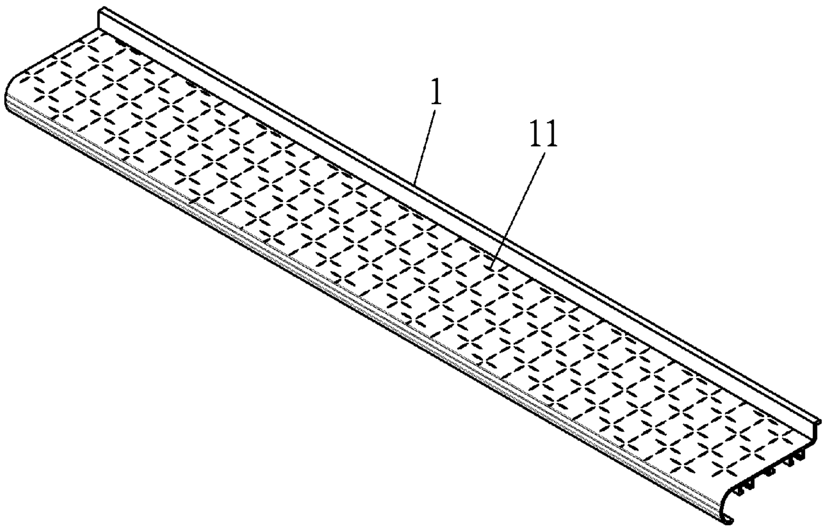
FIG.1 (PRIOR ART)
FIG. 1 is a perspective view of a conventional vehicle pedal.
Figure 2:
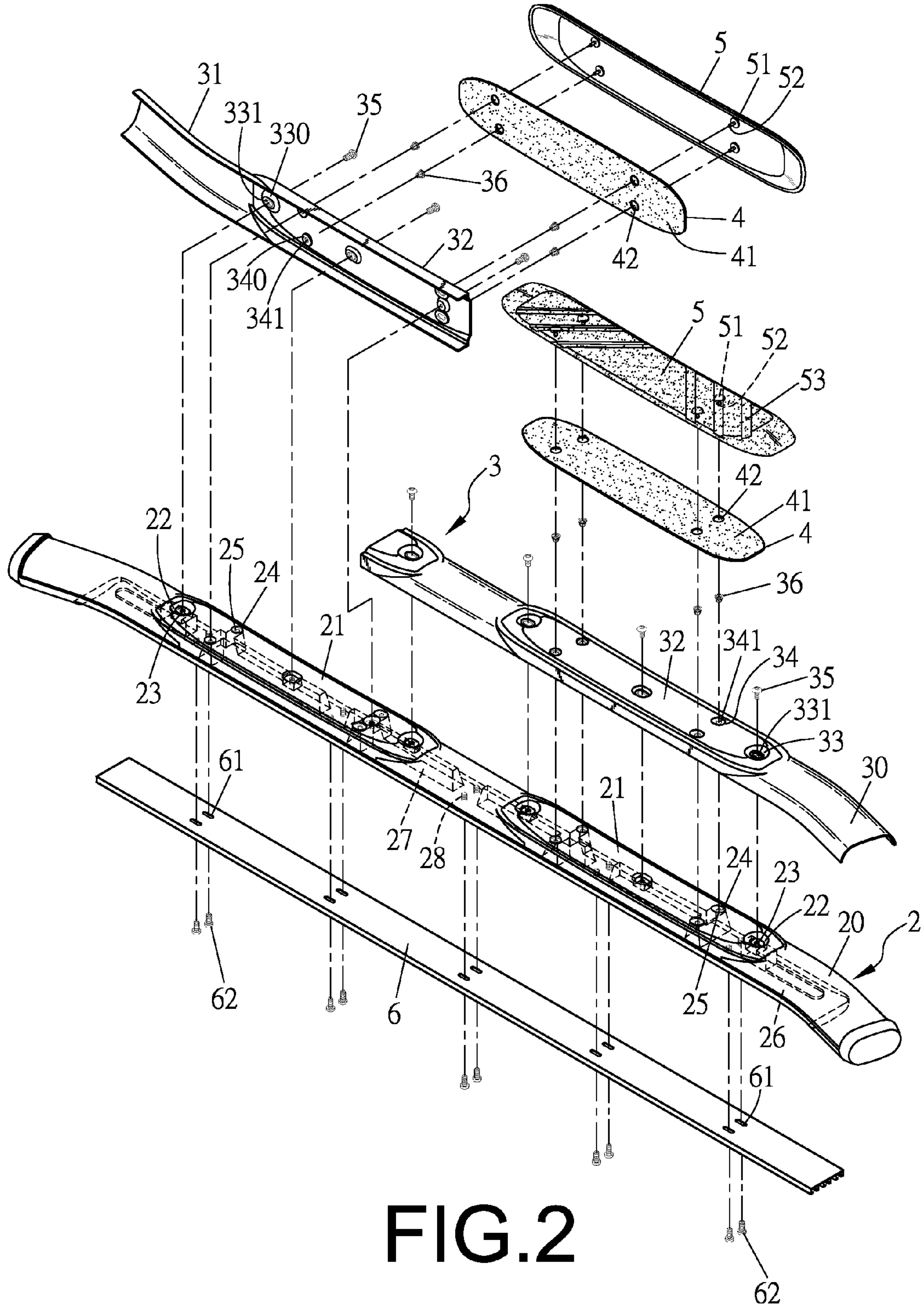
FIG. 2 is an exploded perspective view of a preferred embodiment of a vehicle pedal in the present invention.
Figure 3:
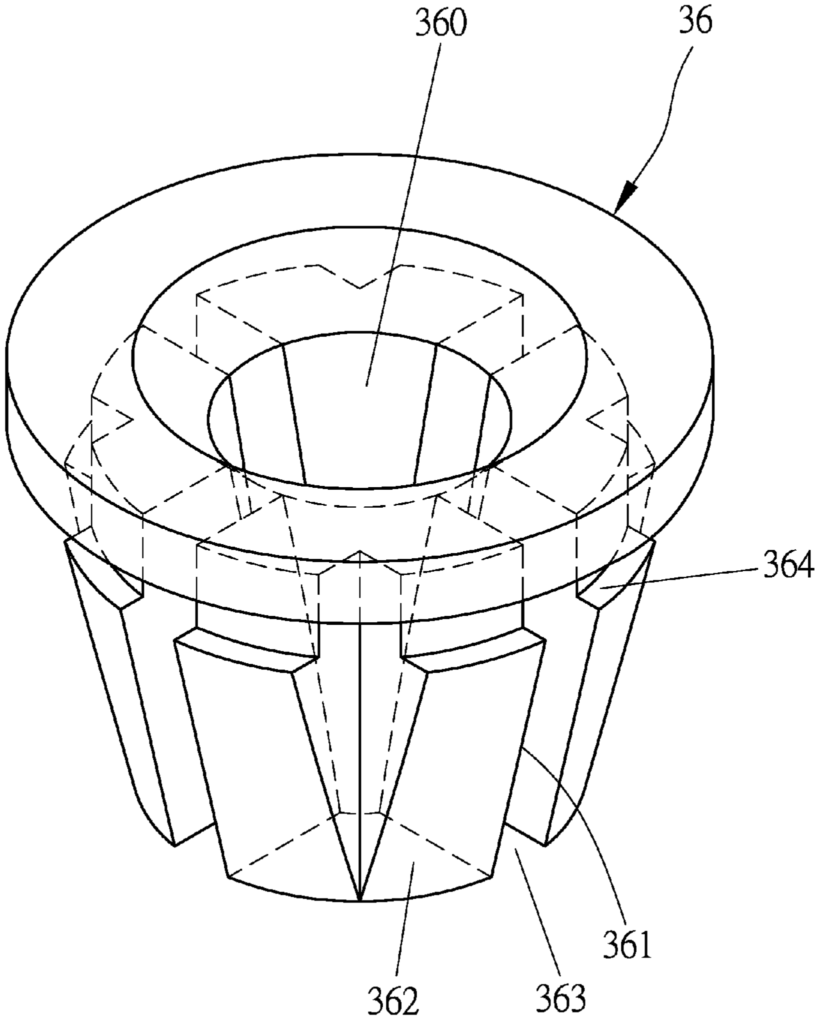
FIG. 3 is a perspective view of a positioning block in the preferred embodiment of a vehicle pedal in the present invention.
Figure 4:
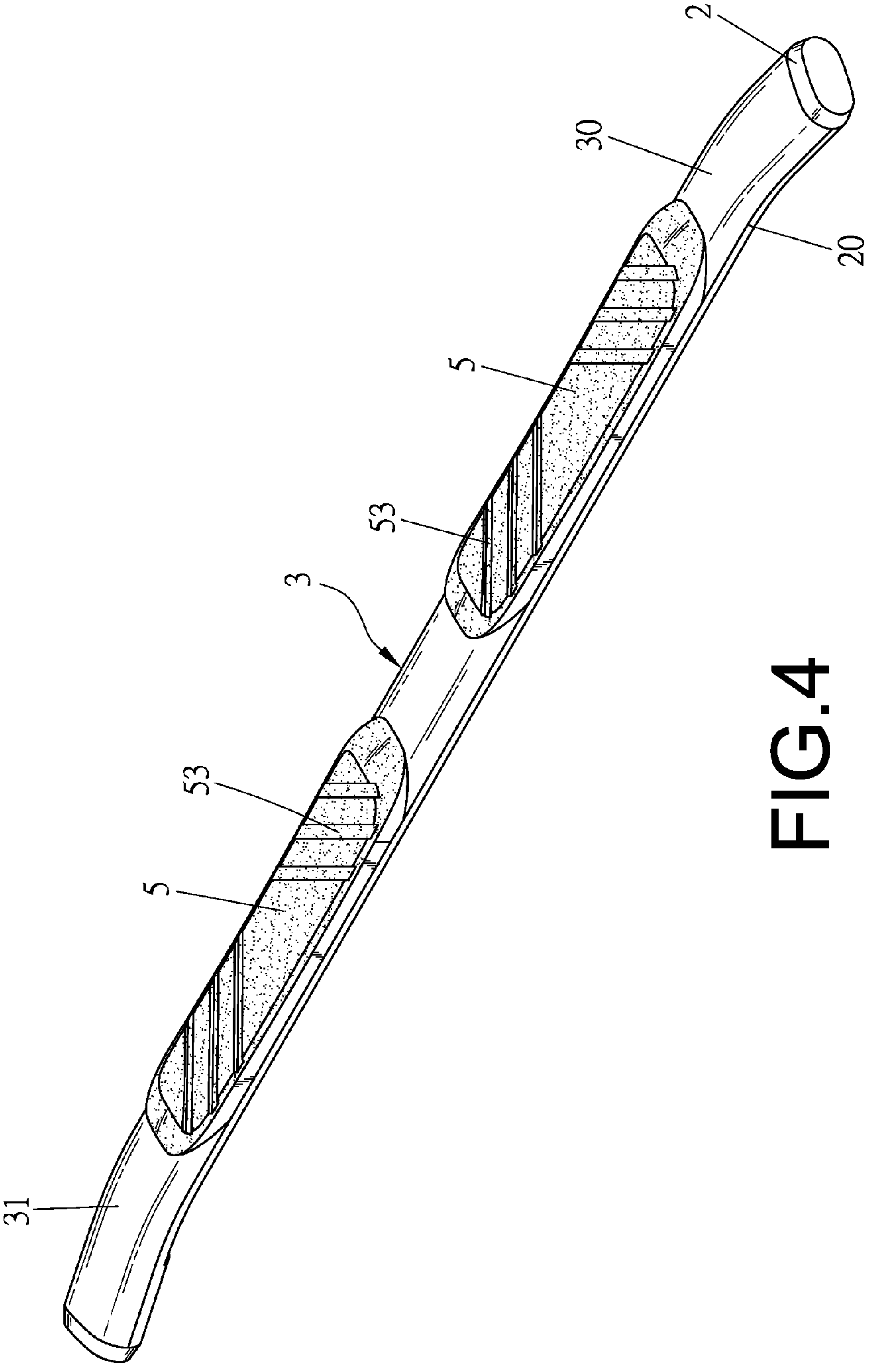
FIG. 4 is a perspective view of the preferred embodiment of a vehicle pedal in the present invention.
Figure 5:
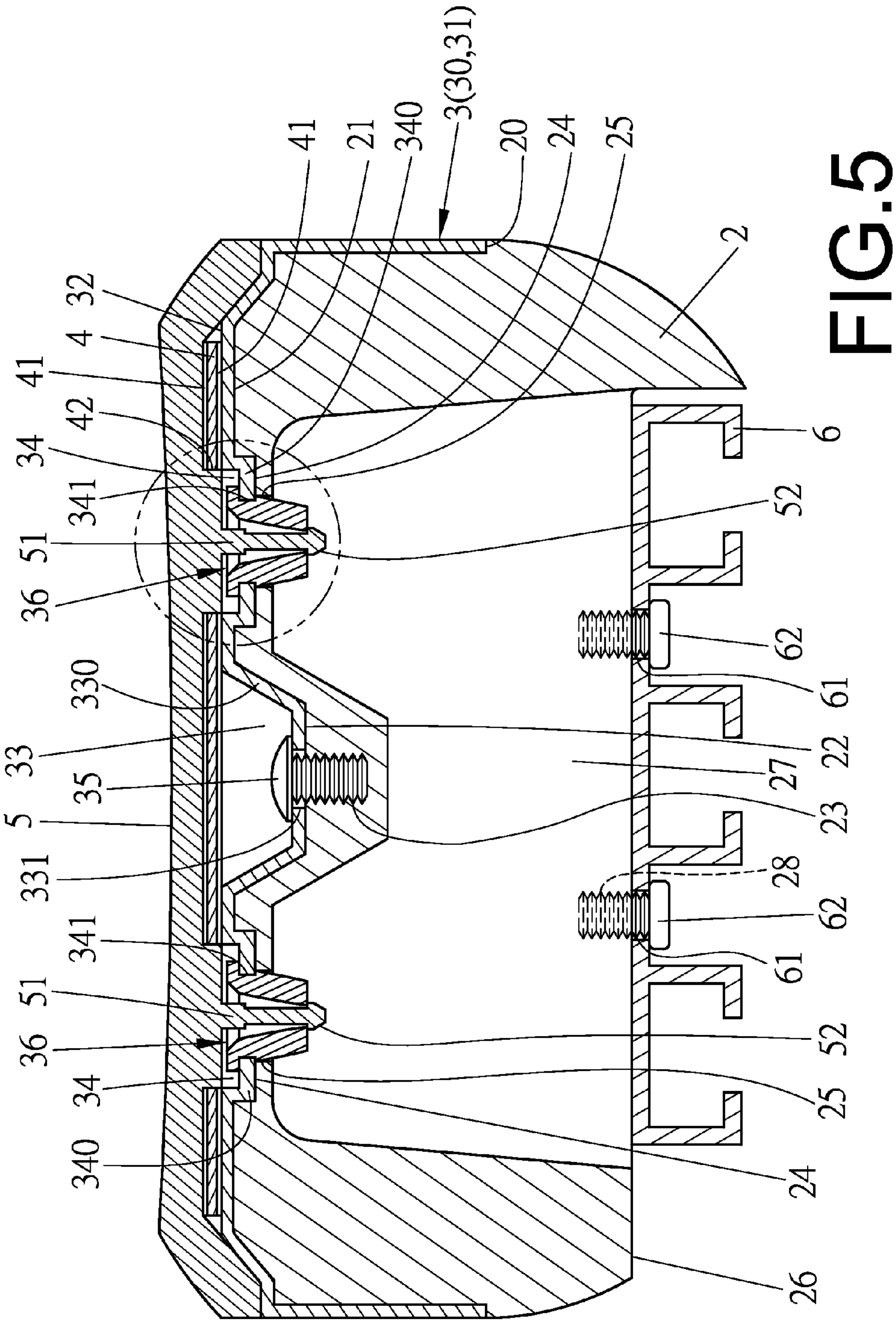
FIG. 5 is a cross-section view of the preferred embodiment of a vehicle pedal in the present invention.
Figure 6:
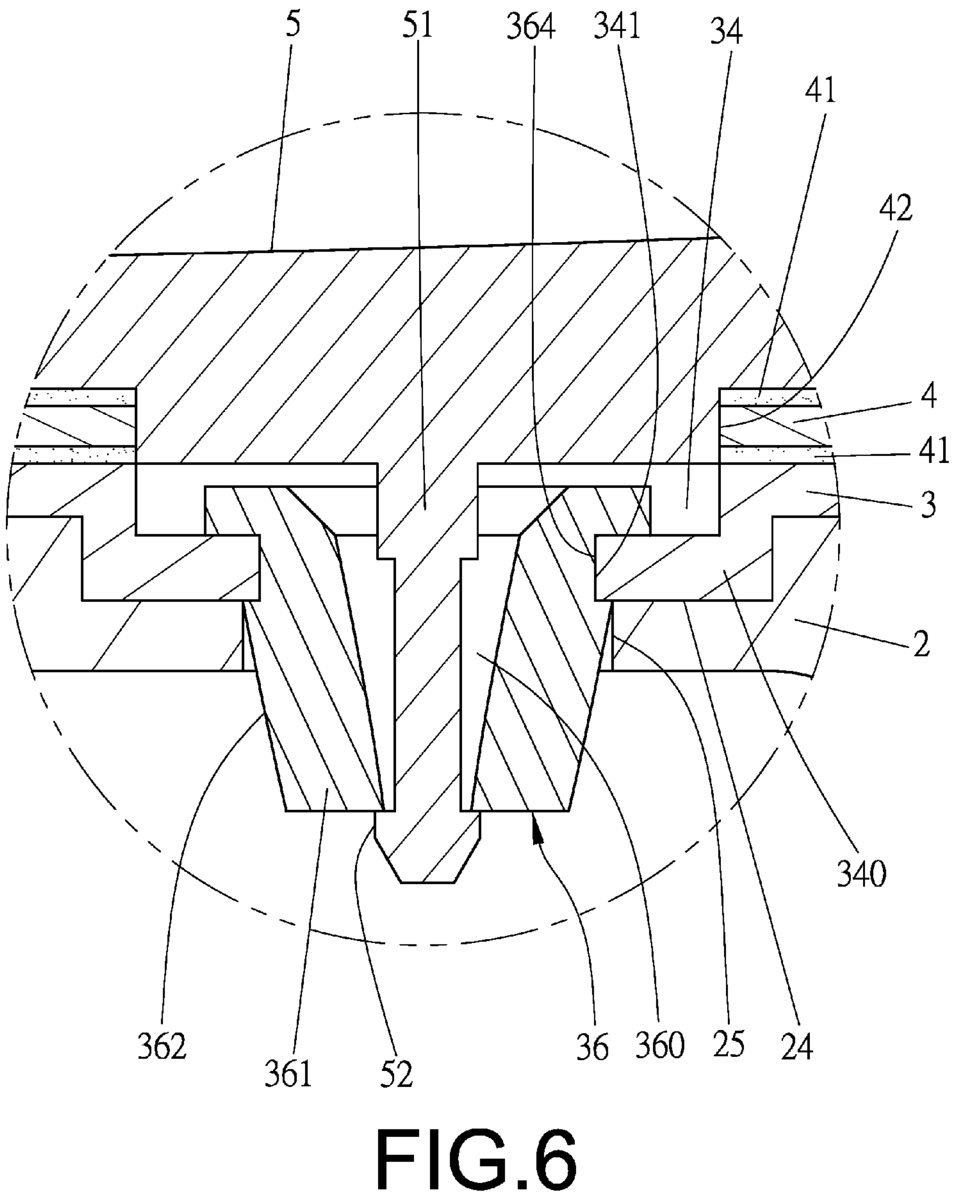
FIG. 6 is a partial magnified cross-section view of the preferred embodiment of a vehicle pedal in the present invention.

As shown in FIGS. 2 and 3, a preferred embodiment of a vehicle pedal in the present invention is provided with a main plastic pedal 2, a decoration 3, two adhesive sheets 4, two anti-slipping rubber plates 5 and a rack 6.

The main plastic pedal 2 is provided with a supporting surface 20, at least a pedaling portion 21 formed in the supporting surface 20, plural conical grooves 22 formed in the pedaling portion 21, and a threaded hole 23 bored in each of the conical grooves 22. In addition, plural small recesses 24 are formed in the pedaling portion 21, with a through hole 25 bored in each of the small recesses 24. The main plastic pedal 2 is also provided with a large recess 26 formed in the bottom. Formed in the large recess 26 are plural lengthy grooves 27 and plural screw holes 28.

The decoration 3 is laid on the supporting surface 20 of the main plastic pedal 2, composed of a long decorating plate 30 and a short decorating plate 31 combined together. Each of the long decorating plate 30 and the short decorating plate 31 includes a pedaling portion 32 corresponding to the pedaling portion 21 of the main plastic pedal 2. The pedaling portion 32 is provided with plural conical grooves 33 and plural small recesses 34. Formed in the bottom of the decoration 3 to correspond to each of the conical grooves 33 is a projection 330. And formed in the bottom of the decoration 3 to correspond to each of the small concaves 34 is a projection 340. Each of the conical grooves 33 has a through hole 331 bored in the center for being inserted by a screw 35 and each of the small concaves 34 has a through hole 341 bored in the center for being fitted by a positioning block 36. As shown in FIG. 3, the positioning block 36 is provided with a through hole 360 bored in the center, a circumferential tapered wall 361 extending down from a circular flat wall, plural vertical grooves 363 formed equidistantly spaced apart around the circumferential tapered wall 361, and a fitting groove 364 formed between the circumferential tapered wall 361 and the circular flat wall. The circumferential tapered wall 361 has a conical outer surface 362.

The adhesive sheets 4 are respectively laid on the pedaling portions 32 of the decoration 3, with two sides of each of the adhesive sheets 4 respectively coated with a glue layer 41. And each of the adhesive sheets 4 is bored with plural holes 42.

The anti-slipping rubber plates 5 are installed on the pedaling portions 32 of the decoration 3, respectively provided with plural positioning bars 51 located on the bottom, and plural grooves 53 cut in the top. The free end of each positioning bar 51 is used as a blocking end 52 formed conical.

The rack 6 is installed in the large recess 26 of the main plastic pedal 2, provided with plural holes 61 for being inserted by screws 62.

In assembling, as shown in FIGS. 2~6, the long decorating plate 30 and the short decorating plate 31 are first axially combined together and laid on the supporting surface 20 of the main plastic pedal 2. By the time, the projections 330 and 340 of the long decorating plate 30 and the short decorating plate 31 are respectively inserted into the conical grooves 22 and the small recesses 24 of the pedaling portion 21 of the main plastic pedal 2, with the screws 35 inserted through the through holes 331 of the short decorating plate 31 to threadably engage with the threaded holes 23 of the main plastic pedal 2 to keep the decoration 3 fixedly positioned on the supporting surface 20 of the main plastic pedal 2. The through holes 25 are just facing the through holes 341 of the decoration 3. Next, by means of the longitudinal grooves 363 to enable the circumferential tapered wall 361 to elastically shrink inward, the positioning block 36 can be inserted into the through hole 341 of the decoration 3 and the through hole 25 of the main plastic pedal 2 until the fitting groove 364 is engaged with the through hole 341, making the positioning block 36 restricted by the through hole 341. By means of the glue 41, the adhesive sheets 4 are successively glued on the pedaling portions 32 of the long decorating plate 30 and the short decorating plate 31, with the through holes 42 corresponding to the small recesses 34 of the pedaling portions 32 of the decoration 3. Then, the positioning bars 51 of the anti-slipping rubber plates 5 are inserted into the through holes 42 of the adhesive sheets 4 and the through holes 360 of the positioning blocks 36. It is to be noted that as the blocking end 52 is formed conical, it can force the circumferential conical wall 361 of the positioning block 36 to expand outward while being inserted through the through hole 360 of the positioning block 36. When the anti-slipping rubber plates 5 are completely attached on the pedaling portions 32 of the decoration 3, their bottoms are glued with the upper glue layers 41 of the adhesive sheets 4, with each of the blocking ends 52 extending out of the through hole 360 of the positioning block 36 to be blocked at the bottom of the circumferential tapered wall 361. So the anti-slipping rubber plates 5 are stably fixed on the pedaling portions 32 of the decoration 3. Finally, with the screws 62 inserted through the through holes 61 of the rack 6 to threadably engage with the threaded holes 28 of the main plastic pedal 2, the rack 6 is fixedly positioned at the bottom of the main plastic pedal 2. Then, the assembly of the vehicle pedal is thus finished. As described above, the anti-slipping rubber plates 5 are positioned by not only being glued on the adhesive sheets 4, but also being fastened by the positioning blocks 36, they are absolutely not apt to be detached.

In using, when the vehicle pedal is installed at a car's side, the anti-slipping rubber plates 5 can create sufficient friction with shoes to assure anti-slipping performance. By means of the rack 6, the strength of the main plastic pedal 2 can wholly be stepped up. And, by virtue of the decoration 3, the whole appearance of the vehicle pedal becomes more aesthetic.

While the preferred embodiment of the invention has been described above, it will be recognized and understood that various modifications may be made therein and the appended claims are intended to cover all such modifications that may fall within the spirit and scope of the invention.

What is claimed is:

1. A vehicle pedal comprising:

a main plastic pedal provided with a supporting surface, at least a pedaling portion formed in said supporting surface, plural conical grooves formed in said pedaling portion, a threaded hole bored in each of said conical grooves, plural small recesses formed in said pedaling portion, a through hole bored in each of said small recesses;

a decoration laid on said supporting surface of said main plastic pedal and provided with at least a pedal portion to correspond to said pedal portion of said main plastic pedal, said pedal portion provided with plural conical grooves, each said conical groove having a through hole bored in a center for being inserted by a screw to threadably engage with said threaded hole of said main plastic pedal, plural projections formed in a bottom of said decoration to correspond to said conical grooves and employed to engage with said conical grooves of said main plastic pedal, said pedal portion further provided with plural small recesses, plural projections formed in a bottom of said decoration to correspond to said small recesses, each said small recess having a through hole bored in a center for being fitted by a positioning block;

at least an adhesive sheet correspondingly laid on said pedaling portion of said decoration and provided with plural holes, said adhesive sheet having two sides respectively coated with a glue layer;

at least an anti-slipping rubber plate correspondingly installed on said pedaling portion of said decoration and glued with said adhesive sheet, said anti-slipping rubber plate provided with plural positioning bars located on a bottom for being inserted through said holes of said adhesive sheet to be restricted by said positioning bars; and a rack installed at a bottom of said main plastic pedal.

2. The vehicle pedal as claimed in claim 1, wherein said positioning block of said decoration is provided with a through hole bored in a center and a circumferential tapered wall extending down from a circular flat wall of said positioning block, plural vertical grooves formed equidistantly spaced apart around said circumferential tapered wall, a fitting groove formed between said circumferential tapered wall and said circular flat wall, said circumferential tapered wall having a conical outer surface.

3. The vehicle pedal as claimed in claim 1, wherein each said positioning bar of said anti-slipping rubber plate has a free end formed as a blocking end.

* * * * *